(12) United States Patent
Yasuda et al.

(10) Patent No.: US 6,193,206 B1
(45) Date of Patent: Feb. 27, 2001

(54) ACTIVE VIBRATION ISOLATOR

(75) Inventors: Masashi Yasuda; Fumiaki Itojima; Masaki Tsuchiya, all of Amagasaki (JP)

(73) Assignee: Tokkyokiki Corporation (JP)

( * ) Notice: Subject to any disclaimer, the term of this patent is extended or adjusted under 35 U.S.C. 154(b) by 0 days.

(21) Appl. No.: 09/121,214

(22) Filed: Jul. 23, 1998

(30) Foreign Application Priority Data

Feb. 18, 1998 (JP) .................................................. 10-036301

(51) Int. Cl.$^7$ .................................................. F16M 13/00
(52) U.S. Cl. .......................... 248/550; 267/136; 188/378
(58) Field of Search .................................. 248/550, 560, 248/561, 575; 267/140.11, 136; 188/378

(56) References Cited

U.S. PATENT DOCUMENTS

| | | | |
|---|---|---|---|
| 5,020,781 | * | 6/1991 | Huang .................................. 267/136 |
| 5,127,622 | * | 7/1992 | Whelpley et al. .................... 248/550 |
| 5,255,764 | * | 10/1993 | Kurabayashi et al. ............... 188/380 |
| 5,456,341 | * | 10/1995 | Ganrjost et al. ..................... 188/378 |
| 5,615,868 | * | 4/1997 | Murray .............................. 267/63.27 |
| 5,628,499 | * | 5/1997 | Ikeda et al. ...................... 267/140.14 |
| 5,660,255 | * | 8/1997 | Schubert et al. ..................... 188/378 |
| 5,848,663 | * | 12/1998 | Kuriki .................................. 180/300 |

FOREIGN PATENT DOCUMENTS 5-149379    6/1993 (JP) .

* cited by examiner

*Primary Examiner*—Anita M. King
(74) *Attorney, Agent, or Firm*—Ostrolenk, Faber, Gerb & Soffen, LLP

(57) ABSTRACT

By a controller 18 which receives signal input from a first sensor 16 for detecting the vibratory state of an object O to be isolated from vibration and from a second sensor 17 for detecting the vibratory state of an intermediate mass element 13, a signal is outputted to a power input portion 12 of a piezoelectric element 11 to cause a voltage variation such that the intermediate mass element 13 vibrates to cancel out the vibrations of the object O in an acting direction.

17 Claims, 8 Drawing Sheets

ACTIVE VIBRATION ISOLATOR

FIELD OF THE INVENTION

The present invention relates to an active vibration isolator which is suitable for cut-off and suppression of microvibrations of precision instruments, e.g., in a factory for manufacturing semiconductor or a factory for manufacturing products using laser.

DESCRIPTION OF THE PRIOR ART

Japanese Unexamined Patent Publication No. 5-149379 discloses an active vibration isolator which employs a piezoelectric element. The active vibration isolator has a basic configuration of a feedback control loop, which comprises a spring-mass system of one degree of freedom employing spring means having thin elastic bodies and metal plates laminated alternately and having a high rigidity for compression and a low shear rigidity and comprises an actuator employing the piezoelectric element.

In addition, an active vibration isolator having an intermediate mass element interposed in a spring-mass system has been proposed. The active vibration isolator has a basic configuration of a feedback control loop, in which a detection value of vibratory state of the intermediate mass element is employed as a feedback signal such that a piezoelectric element coupled directly to the intermediate mass element is driven on the basis of this feedback signal.

The vibration isolating performance of the above-mentioned active vibration isolators in a high-frequency region depends on the passive vibration isolating characteristic, and therefore problems which will be described below arise in the cut-off and suppression of the microvibrations of precision instruments or the like, in the case that vibration isolation, e.g., of about −60 dB (transmissibility of vibration of −60 dB) is required at a frequency, e.g., in the vicinity of 300 Hz.

In order to achieve vibration isolation of about −60 dB at a frequency in the vicinity of 300 Hz, a resonance point of the vibration system including the active vibration isolator and an object to be isolated from vibration should be set at in the vicinity of 3 to 4 Hz, as shown by a curve II (dashed line) in FIG. 8. For this purpose, the amplitude of the piezoelectric element has to be increased and the spring constant of the spring means has to be decreased. However, the stroke of the piezoelectric element is limited and therefore it is practically impossible to make the above vibration system compatible with the resonance point in a low-frequency area not more than 10 Hz by the piezoelectric element. On the other hand, decreasing the spring constant disadvantageously increases the amplitudes of the vibrations of the object.

In a spring-mass system of one degree of freedom, accordingly, the limit of the setting of the resonance point is in the vicinity of 15 Hz (this value depends on the amplitude of the actuator) at best, as shown by a curve III (chain line) in FIG. 8, and thus a sufficient vibration isolating performance in the high-frequency region cannot be obtained.

In a spring-mass system of two degrees of freedom, as shown by a curve IV (two-dot chain line) in FIG. 8, the vibration isolating performance in the high-frequency region is improved, while there occur two resonance points.

SUMMARY OF THE INVENTION

The invention, which has been done in order to eliminate such problems of the prior arts, is intended to provide an active vibration isolator which prevents any resonance points from appearing in the low-frequency region and provides a sufficient vibration isolating performance in the high-frequency region.

In order to achieve the above-mentioned object, in accordance with a first aspect of the invention, an active vibration isolator comprises an intermediate mass element placed in the space between an object to be isolated from vibration and a supporting surface; a first elastic member having one end fixed to the intermediate mass element and the other end fixed to the object and exerting spring action on the intermediate mass element and the object; a solid element or a fluid element placed between the intermediate mass element and the supporting surface and, with respect to an acting direction along its length that varies with a variation in voltage, magnetic field generated in the solid element, or air pressure generated in the solid element, having one end fixed to the supporting surface or having the other end fixed to the intermediate mass element; a second elastic member placed between the intermediate mass element and the solid element or between the solid element and the supporting surface and exerting spring action on the intermediate mass element, directly or indirectly through the solid element; a power input portion for causing the variation in voltage, magnetic field in the solid element, or air pressure in the fluid element; a first sensor for detecting the vibratory state of the object with respect to the acting direction; a second sensor for detecting the vibratory state of the intermediate mass element with respect to the acting direction; and a controller for receiving signal input from the first sensor and from the second sensor, and for outputting to the power input portion a signal which causes the variation in voltage, magnetic field, or air pressure such that the intermediate mass element vibrates to cancel out the vibrations of the object in the acting direction.

In accordance with a second aspect of the invention, an active vibration isolator comprises an intermediate mass element placed in the space between an object to be isolated from vibration and a supporting surface; a first elastic member having one end fixed to the intermediate mass element and the other end fixed to the object and exerting spring action on the intermediate mass element and the object; a linear motor placed between the intermediate mass element and the supporting surface and, with respect to an acting direction along its length that varies with a variation in magnetic field, having one end fixed to the supporting surface and the other end fixed to the intermediate mass element, and having spring action; a power input portion for causing the variation in magnetic field in the linear motor; a first sensor for detecting the vibratory state of the object with respect to the acting direction; a second sensor for detecting the vibratory state of the intermediate mass element with respect to the acting direction; and a controller for receiving signal input from the first sensor and from the second sensor, and for outputting to the power input portion a signal which causes the variation in magnetic field such that the intermediate mass element vibrates to cancel out the vibrations of the object in the acting direction.

In accordance with a third aspect of the invention, an active vibration isolator comprises an intermediate mass element placed in the space between an object to be isolated from vibration and a supporting surface; a first elastic member having one end fixed to the intermediate mass element and the other end fixed to the object and exerting spring action on the intermediate mass element and the object; a pneumatic actuator placed between the intermediate mass element and the supporting surface and, with respect to an acting direction along its length that varies with a variation in air pressure generated inside thereof, having one end fixed to the supporting surface and the other end fixed to the intermediate mass element, and having spring action; a power input portion for causing the variation in air pressure in the pneumatic actuator; a first sensor for detecting the vibratory state of the object with respect to the acting direction; a second sensor for detecting the vibratory state of the intermediate mass element with respect to the acting direction; and a controller for receiving signal input from the first sensor and from the second sensor, and for outputting to the power input portion a signal which causes the variation in air pressure such that the intermediate mass element vibrates to cancel out the vibrations of the object in the acting direction.

In accordance with a fourth aspect of the invention, the controller includes a main feedback system by which a signal from the first sensor is fed back to the power input portion through a first controlled element and a second controlled element, and a local feedback system by which a signal from the second sensor is fed back to the power input portion through the second controlled element, the local feedback system causing the solid element, the linear motor, or the pneumatic actuator to generate an operating force which cancels out the vibrations of the intermediate mass element, the main feedback system causing the solid element, the linear motor, or the pneumatic actuator to generate an operating force which causes the intermediate mass element to vibrate so as to cancel out the vibrations of the object in the acting direction.

In accordance with a fifth aspect of the invention, the solid element is formed of a piezoelectric element of which the length varies with a variation in voltage.

In accordance with a sixth aspect of the invention, the solid element is formed of a magneto-striction element of which the length varies with a variation in magnetic field.

In accordance with a seventh aspect of the invention, each of the first and second sensors is an acceleration sensor or a velocity sensor.

BRIEF DESCRIPTION OF THE DRAWINGS

These and other objects and features of the present invention will become apparent from the following description taken in conjunction with the accompanying drawings in which.

DETAILED DESCRIPTION OF THE INVENTION

An embodiment of the invention is now described with reference to the accompanying drawings.

Figure 1:
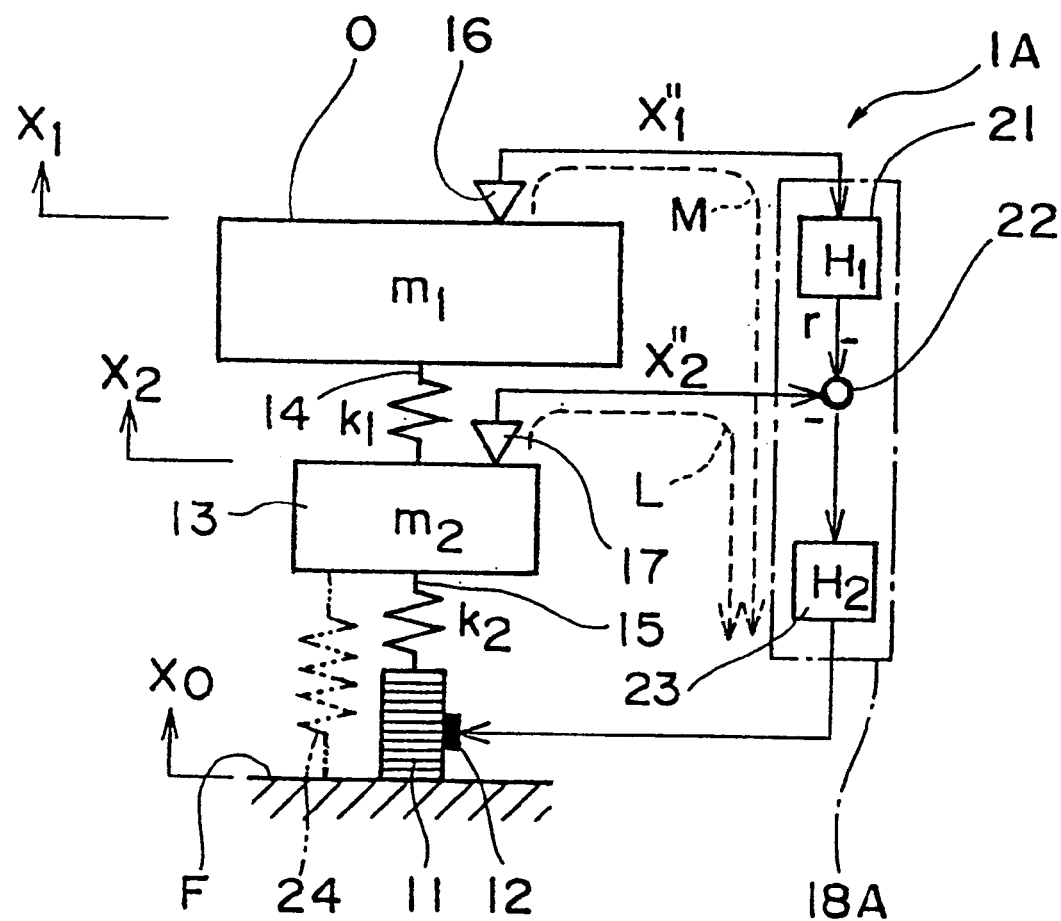
FIG. 1 schematically illustrates an active vibration isolator in accordance with the invention applied to an object to be isolated from vibration.

FIG. 1 illustrates an active vibration isolator 1A in accordance with the invention applied to an object O to be isolated from vibration having a mass of $m_1$.

The active vibration isolator 1A comprises a piezoelectric element 11 as an example of a solid element, a power input portion 12 of the piezoelectric element 11, an intermediate mass element 13 having a mass of $m_2$, a first elastic member 14 having a spring constant $k_1$, a second elastic member 15 having a spring constant $k_2$, a first sensor 16, a second sensor 17 and a controller 18A.

As is well known, the piezoelectric element 11 has a characteristic of varying its thickness in response to variation in the voltage generated therein. The piezoelectric element 11 acts in its longitudinal direction, i.e., in the vertical direction in FIG. 1, and one end of the element 11 with respect to the acting direction, i.e., the bottom end in FIG. 1, is fixed to a supporting surface F, such as a floor surface.

The power input portion 12 applies an operating voltage to the piezoelectric element 11 on the basis of a control signal inputted from the controller 18A.

The intermediate mass element 13 is positioned between the other end of the piezoelectric element 11 and the object O with respect to the acting direction.

The first elastic member 14 has one end fixed to the intermediate mass element 13 and the other end fixed to the object O, and exerts spring action on the intermediate mass element 13 and the object O.

The second elastic member 15 has one end fixed to the piezoelectric element 11 and the other end fixed to the intermediate mass element 13, and exerts spring action on the piezoelectric element 11 and the intermediate mass element 13.

The first sensor 16 detects the vibratory state, i.e., the acceleration in the embodiment, of the object O with respect to the acting direction.

The second sensor 17 detects the vibratory state, i.e., the acceleration in the embodiment, of the intermediate mass element 13 with respect to the acting direction.

The controller 18A receives signals from the first sensor 16 and the second sensor 17, and outputs a signal to the power input portion 12 of the piezoelectric element 11 to cause a voltage variation such that the intermediate mass element 13 vibrates to cancel out the vibrations of the object O in the acting direction.

More specifically, the controller 18A forms a main feedback system M by which a signal from the first sensor 16 is fed back to the power input portion 12 through a first control element 21, an adder 22 and a second control element 23, and forms a local feedback system L by which a signal from the second sensor 17 is fed back to the power input portion 12 through the adder 22 and the second control element 23. The local feedback system L causes the piezoelectric element 11 to generate an operating force u which cancels out the vibrations of the intermediate mass element 13. Furthermore, the main feedback system M causes the piezoelectric element 11 to generate an operating force which causes the intermediate mass element 13 to vibrate so as to cancel out the vibrations of the object O in the acting direction.

As described above, the active vibration isolator 1A positively utilizes the vibration cut-off characteristic and vibration suppressing characteristic resulted from the interaction between the intermediate mass element 13 and the first elastic member 14 and from the interaction between the intermediate mass element 13 and the second elastic member 15. Thus the active vibration isolator 1A indirectly controls the vibrations of the object O such that the vibration of the supporting surface F as a source of the vibrations of the intermediate mass element 13 and of the object O and vibration caused by the piezoelectric element 11 as an example of an actuator eliminate each other. At this time, the active vibration isolator 1A concurrently acts to suppress and eliminate vibration caused by disturbance which act directly on the object O.

The active vibration isolator 1A is designed through the following procedures:

① A control gain of the local feedback system L is determined such that an active control is performed so as to cancel out the vibration of the intermediate mass element 13 caused by vibration of the supporting surface F such as vibration of a floor.

② The adder 22 is interposed as a summing point for the local feedback system L such that the control gain of the local feedback system L acts as a forward element.

③ A control gain of the main feedback system M is determined such that a signal is inputted into the adder 22 to cause the piezoelectric element 11 to vibrate so as to cancel out the vibrations of the object O.

The control characteristic of each feedback system in the active vibration isolator 1A arranged as above can be expressed by using transfer function, as follows.

In the case that the operating force u from the piezoelectric element 11 acts on the intermediate mass element 13 through the second elastic member 15, the characteristic of the passive system including the intermediate mass element 13 and the object O can be expressed by the following equation of motion:

$$\begin{bmatrix} m_1 & 0 \\ 0 & m_2 \end{bmatrix} \begin{Bmatrix} x_1'' \\ x_2'' \end{Bmatrix} + \begin{bmatrix} k_1 & -k_1 \\ -k_1 & k_1+k_2 \end{bmatrix} \begin{Bmatrix} x_1 \\ x_2 \end{Bmatrix} = \begin{Bmatrix} 0 \\ u \end{Bmatrix} \quad (1)$$

$m_1$: mass of the object O to be isolated from vibration
$m_2$: mass of the intermediate mass element 13
$x_1$: displacement of the object O in the acting direction
$x_2$: displacement of the intermediate mass element 13 in the acting direction For simplification, a damping element included in the system is neglected in the equation (1).

By Laplace transformation of the equation (1), transfer functions $G_1$, $G_2$ between the operating force u acting on the intermediate mass element 13 as input and accelerations $x_1''$ and $x_2''$ of the intermediate mass element 13 and the object O, respectively, as outputs in an open loop having the above input and outputs can be expressed as follows:

$$G_1 = \frac{x_1''}{u} = \frac{k_1 s^2}{(m_1 s^2 + k_1)(m_s s^2 + k_1 + k_2) - k_1^2} \quad (2)$$

$$G_2 = \frac{x_2''}{u} = \frac{(m_1 s^2 + k_1)s^2}{(m_1 s^2 + k_1)(m_s s^2 + k_1 + k_2) - k_1^2} \quad (3)$$

Meanwhile, in the equations (2) and (3) subjected to the Laplace transformation, the same notations $x_1''$, $x_2''$, u, $m_1$, $m_2$, $k_1$, and $k_2$ as the equation (1) are employed. Furthermore, s is Laplace operator.

Figure 2:
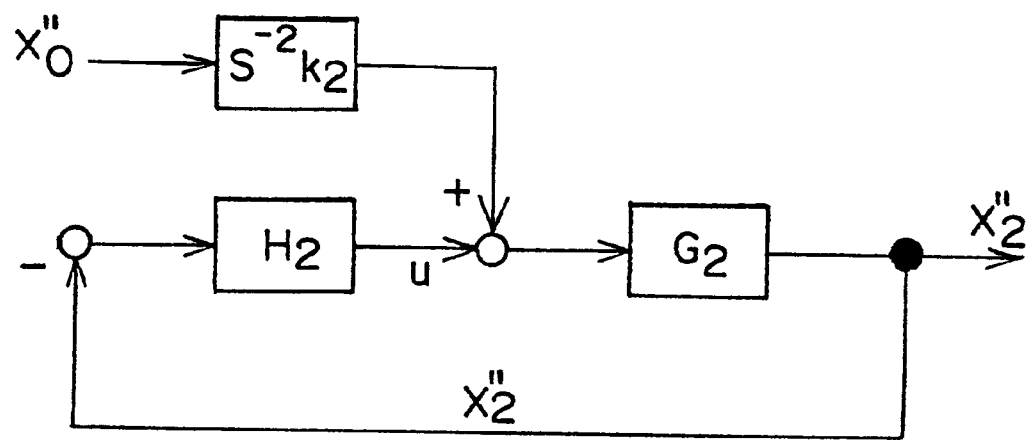
FIG. 2 is a control block diagram of a local feedback control system including an intermediate mass element and the object.

Considering the input from the main feedback system M into the adder 22 described in the design procedure ①, the local feedback system L can be expressed as shown in FIG. 2. Herein, $x_0$ represents the displacement of the supporting surface F in the acting direction and $x_0''$ represents an acceleration as the vibratory state of the supporting surface F.

Accordingly, the transfer function between the operating force u and the acceleration $x_2''$ of the intermediate mass element 13 can be expressed as follows:

$$\frac{x_2''}{u} = \frac{G_2}{1 + G_2 H_2} \quad (4)$$

$H_2$: transfer characteristic of the second controlled element

The transfer function between the vibrations (the acceleration $x_0''$) of the supporting surface F and the acceleration $x_2''$ of the intermediate mass element 13 can be expressed as follows:

$$\frac{x_2''}{x_0''} = \frac{s^{-2} k_2 G_2}{1 + G_2 H_2} \quad (5)$$

$$= \frac{k_2(m_1 s^2 + k_1)}{(m_1 s^2 + k_1)(m_2 s^2 + k_1 + k_2) - k_1^2 + s^2(m_1 s^2 + k_1)H_2}$$

Figure 3:
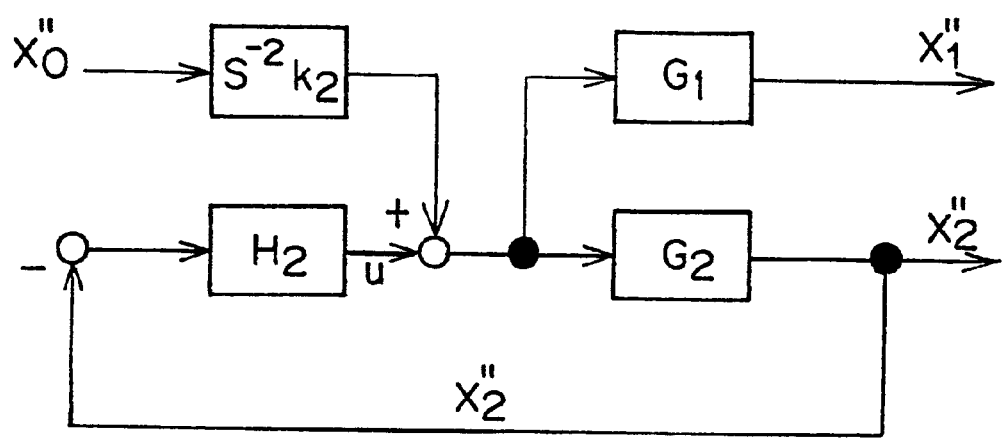
FIG. 3 is a control block diagram of a system in which the vibration output of the object is added to the system shown in FIG. 2.

Considering that the operating force u and the acceleration $x_1''$ of the object O are related to each other by the transfer function $G_1$, a system in which the vibration output of the object is added to the system shown in FIG. 2 can be expressed as shown in FIG. 3. The transfer function between the operating force u and the acceleration $x^{1''}$ of the object O in the active control system including the first elastic element 14 and the object O can be expressed as follows:

$$\frac{x_1''}{u} = \frac{G_1}{1 + G_2 H_2} \quad (6)$$

Figure 4:
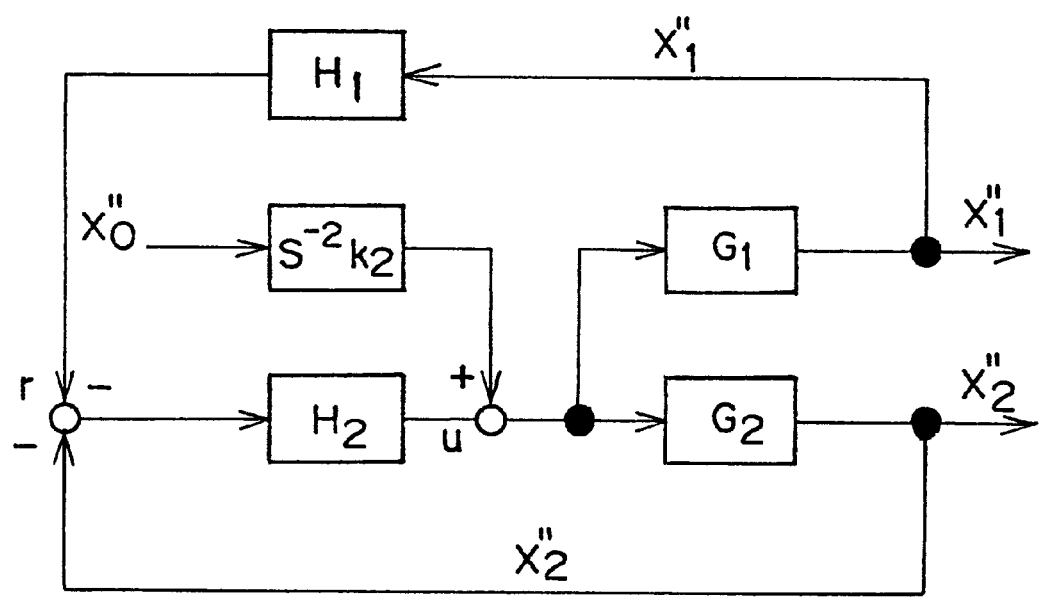
FIG. 4 is a control block diagram of the system shown in FIG. 1.

Accordingly, considering that a main output r from the first controlled element 21 is inputted into the adder 22 as shown in FIG. 1, the system shown in FIG. 1 can be expressed as shown in FIG. 4. That is, the system shown in FIG. 1 is equivalent to the system shown in FIG. 4.

As is evident from FIG. 4, the transfer function between the vibrations with the acceleration $x_0''$ of the supporting surface F and the object O in the system including the input of the main output r into the adder 22 can be expressed as follows:

$$\frac{x_1''}{x_0''} = \frac{s^{-2} k_2 G_1}{1 + H_2 G_2 + H_1 H_2 G_1} \quad (7)$$

$H_1$: transfer characteristic of the first controlled element 21

It can be readily understood from the equation (7) that the transfer characteristics $H_1$ and $H_2$ of the first and second controlled elements 21 and 23 are included only in the denominator and that providing the first and second controlled elements 21 and 23 with feedback gains decreases the transmissibility of vibration from the supporting surface F to the object O.

Figure 5:
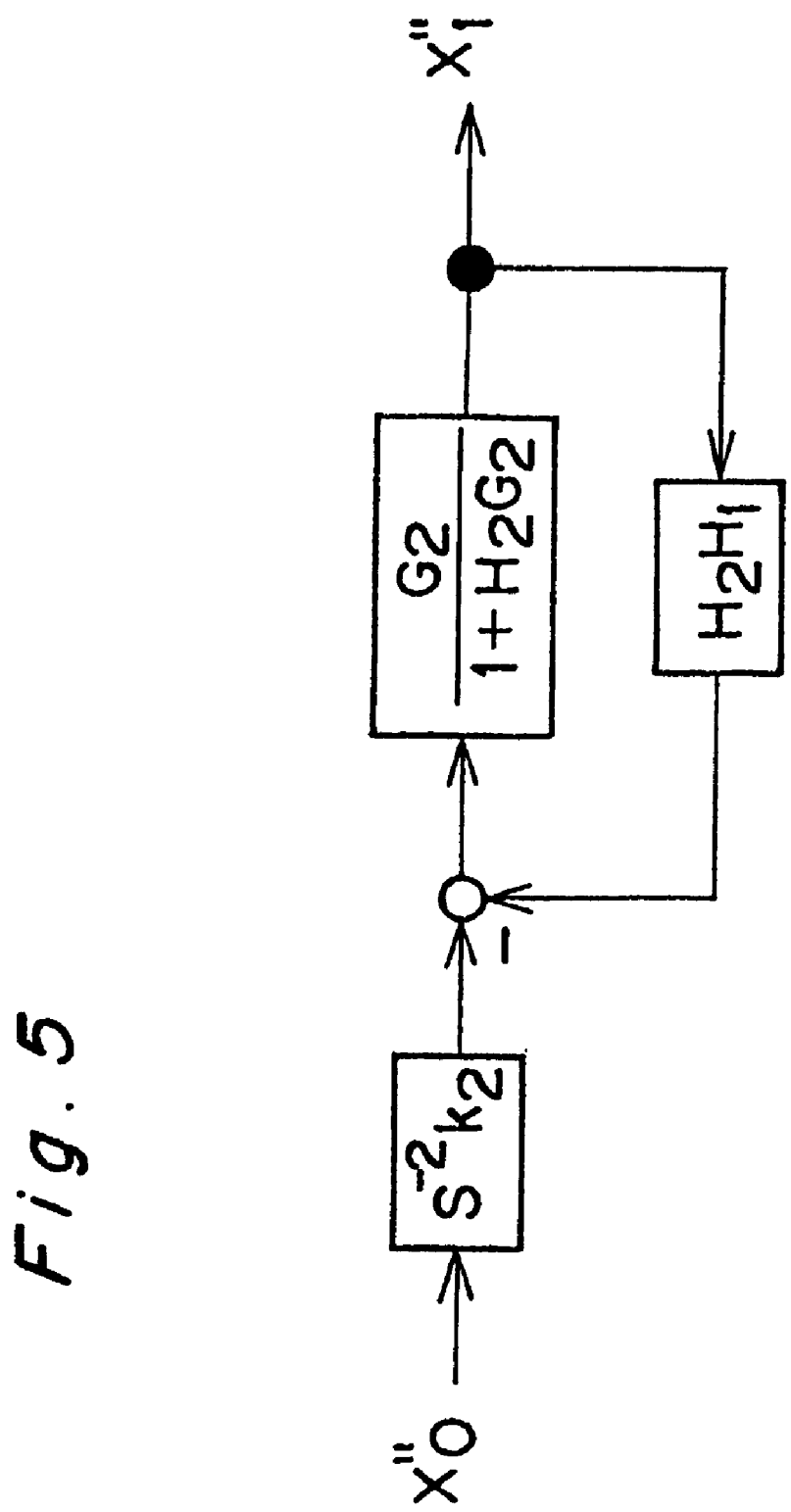
FIG. 5 is a control block diagram which is equivalent to the control block diagram shown in FIG. 4.

The block diagram shown in FIG. 4 can be expressed as shown in FIG. 5.

As described above, it is understood that the transfer characteristics $H_1$ and $H_2$ of the first and second controlled elements 21 and 23 cooperate with each other to contribute to the vibration isolation.

The above embodiment exhibits the apparatus employing the piezoelectric element 11 as the solid element; however, the invention is not limited to the embodiment but may employ a magneto-striction element instead of the piezoelectric element 11. In such an arrangement, the magneto-striction element is vibrated by a variation in the magnetic field strength resulted from a current variation at the power input portion.

As shown in the two-dot chain line in FIG. 1, an elastic member 24 may be provided in parallel with the piezoelectric element 11 and the second elastic member 15 between the supporting surface F and the intermediate mass element 13. In this arrangement also, the transfer characteristics $H_1$ and $H_2$ of the first and second controlled elements 21 and 23 cooperate with each other to contribute to the vibration isolation, as described above.

An active vibration isolator in which the solid element, such as the piezoelectric element 11 and the magneto-striction element, and the second elastic member 15 are positioned in reverse, i.e., the second elastic member 15 is provided on the side of the supporting surface F and the solid element is provided on the side of the intermediate mass element 13, is not different at all from the above-mentioned active vibration isolator 1A in vibration theory, and is included in the invention.

Figure 8:
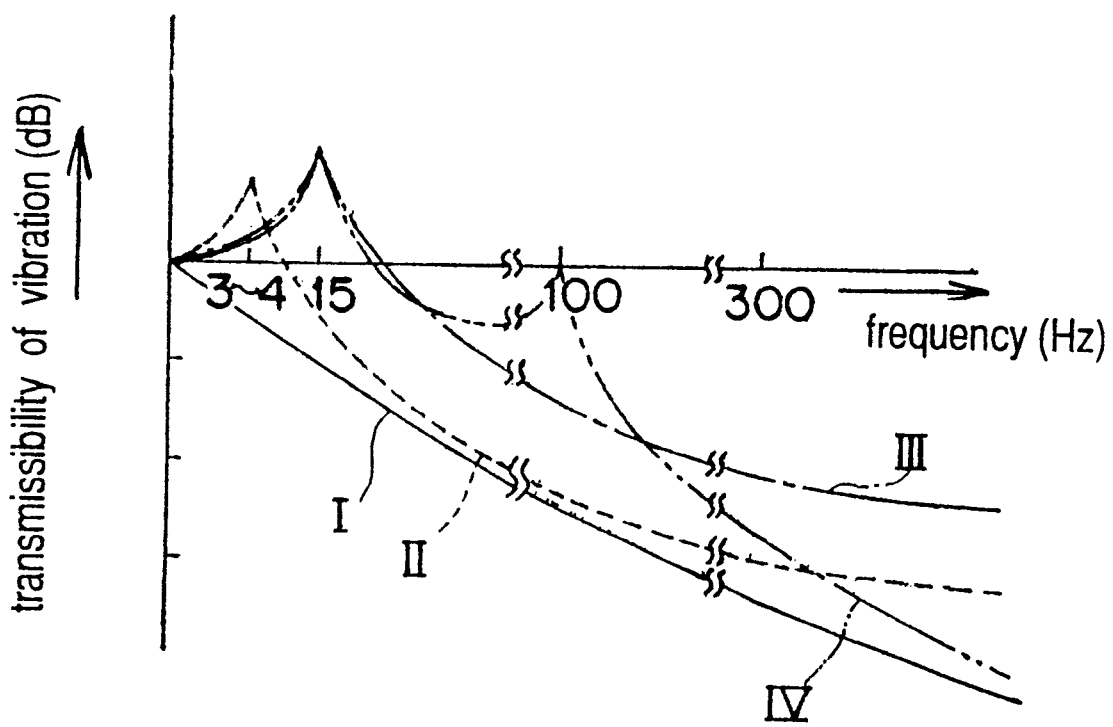
FIG. 8 schematically illustrated frequency characteristics of the transmissibility of vibration of spring-mass systems.

Referring to FIG. 8, a curve I (solid line) exhibits the vibration isolating characteristic of the active vibration isolator in accordance with the above embodiment, where no resonance points exist in the low-frequency region and where the vibration isolating performance is improved in the high-frequency region.

Figure 6:
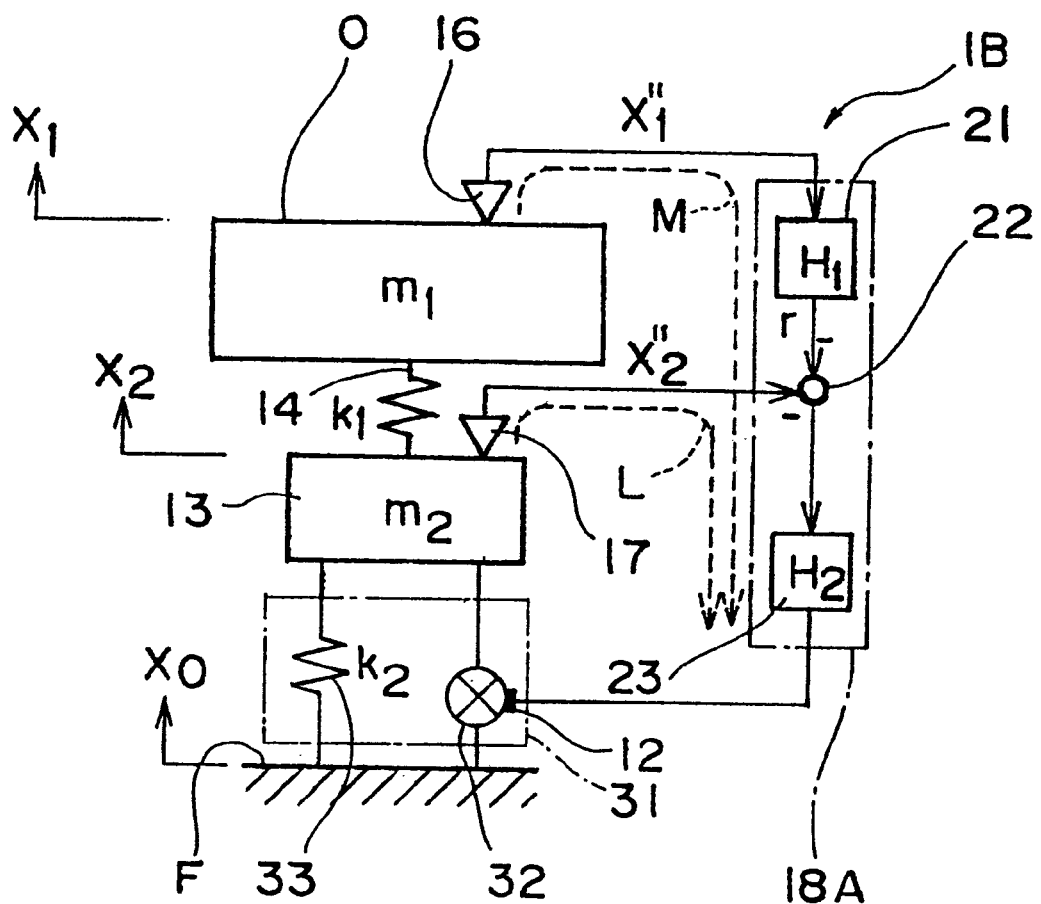
FIG. 6 schematically illustrates another active vibration isolator in accordance with the invention applied to an object to be isolated from vibration.

FIG. 6 illustrates another active vibration isolator 1B in accordance with the invention applied to an object O to be isolated from vibration having a mass of $m_1$. The active vibration isolator 1B is substantially the same as the active vibration isolator 1A shown in FIG. 1 except that the isolator 1B employs a pneumatic actuator or linear motor 31 instead of the piezoelectric element 11 and the second elastic member 15.

As shown in FIG. 6, the pneumatic actuator or linear motor 31 functionally comprises an actuator 32 for vibrating an intermediate mass element 13 and an elastic element 33 for exerting spring action on the intermediate mass element 13.

The above mathematical description also applies to the active vibration isolator 1B with the elastic element 33 having a spring constant $k_2$.

Herein, providing first and second controlled elements 21 and 23 with feedback gains similarly decreases the transmissibility, even though the damping elements included in the system, which was neglected in the above description, are considered and thus the addition of the term of the damping action complicates the equation described above.

Figure 7:
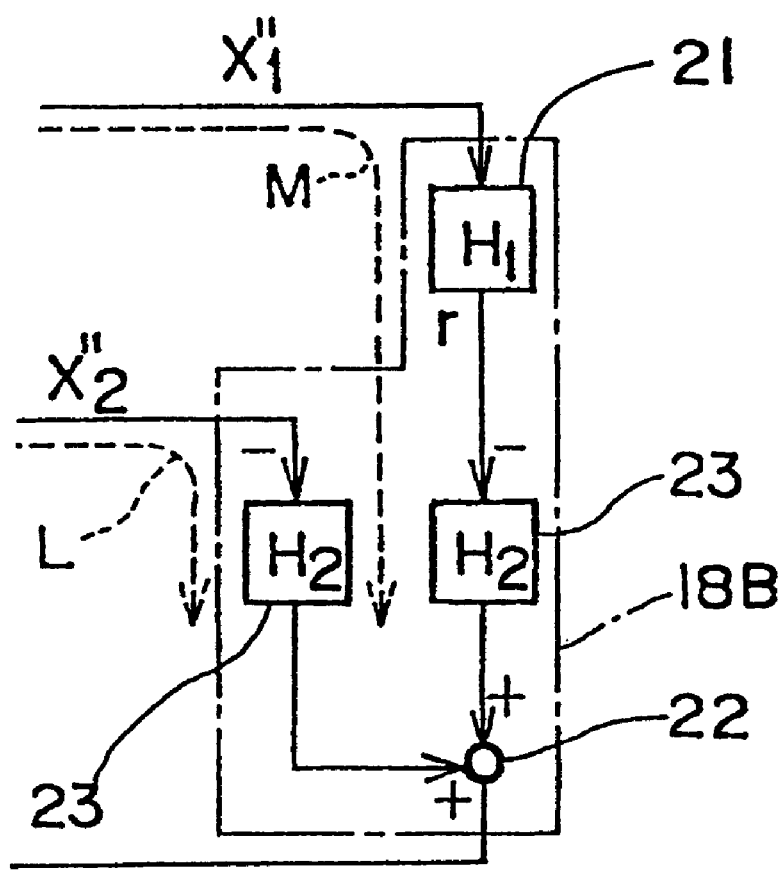
FIG. 7 schematically illustrated a controller which is equivalent to a controller in the active vibration isolators shown in FIGS. 1 and 6.

The controller 18A in the above embodiments is equivalent to a controller 18B shown in FIG. 7, and the invention encompasses an active vibration isolator employing the controller 18B instead of the controller 18A. In the controller 18B, second controlled elements 23 are provided for the main feedback system M and the local feedback system L, respectively, and the output from each second controlled element 23 is inputted into the power input portion 12 through the adder 22.

The above embodiments are of a system of two degrees of freedom; however, a plurality of active vibration isolators 1 in accordance with the invention may be provided for one object O. For example, the active vibration isolators may be provided so as to act in three directions of X, Y and Z axes, respectively, which are orthogonal to one another; the active vibration isolator can be expansively adapted for a system of twelve degrees of freedom including two rigid bodies (the object O and the intermediate mass element 13).

In this arrangement, the first and second sensors 16, 17 do not necessarily have to be in one-to-one relation to the piezoelectric elements 11. For example, three first sensors 16 and three second sensors 17 may be provided in different positions and with respect to different directions, and five piezoelectric elements 11 may be provided in different positions and with respect to different directions. In this arrangement, a signal from one first sensor 16 or one second sensor 17 is not necessarily used for controlling only one piezoelectric element 11 but may be used for controlling another piezoelectric element 11. A plurality of intermediate mass elements 13 may be provided for one object O such that a vibration isolating control system of the active vibration isolator including the first sensor 16, the second sensor 17 and the piezoelectric element 11 referred to above may be structured for each combination of the object O and the intermediate mass element 13.

The above description likewise applies to a case in which a magneto-striction element or a pneumatic actuator or a linear motor is used in place of the piezoelectric element 11.

Velocity sensors may be used as the first sensor 16 and the second sensor 17; the invention encompasses the active vibration isolators comprising such velocity sensors.

In accordance with the invention, as is evident from the above description, by the controller, into which signals are inputted from the first sensor for detecting the vibratory state of the object and from the second sensor for detecting the vibratory state of the intermediate mass element, a signal is outputted to the power input portion of the solid element or the like to cause voltage variation, magnetic field variation or the like such that the intermediate mass element vibrates to cancel out the vibrations of the object in the acting direction.

This arrangement not only prevents any resonance points from appearing in the low-frequency region but reduces low-frequency vibrations, and provides a sufficient vibration isolating performance in the high-frequency region, so that a transmissibility of vibration of about –60 dB in the vicinity of 300 Hz can be effectively achieved.

What is claimed is:

1. An active vibration isolator comprising:
    an intermediate mass element placed in a space between an object to be isolated from vibration and a supporting surface;
    a first elastic member having one end fixed to the intermediate mass element and the other end fixed to the object and exerting spring action on the intermediate mass element and the object;
    a solid element placed between the intermediate mass element and the supporting surface and, with respect to an acting direction along the length thereof that varies with a variation in voltage or magnetic field generated in the solid element, having one end fixed to the supporting surface or having the other end fixed to the intermediate mass element;
    a second elastic member placed between the intermediate mass element and the solid element or between the solid element and the supporting surface and exerting spring action on the intermediate mass element, directly or indirectly through the solid element;
    a power input portion connected to, for causing the variation in voltage or magnetic filed in, the solid element;

a first sensor, fixed relative to the supporting surface, for detecting a vibratory state of the object with respect to the acting direction;

a second sensor, fixed relative to the supporting surface, for detecting a vibratory state of the intermediate mass element with respect to the acting direction; and a controller connected to, for receiving signal input from, the first sensor and the second sensor, and for outputting to the power input portion a signal which causes the variation in voltage or magnetic field such that the intermediate mass element vibrates to cancel out the vibrations of the object in the acting direction.

2. An active vibration isolator as claimed in claim 1, wherein the solid element is formed of a piezoelectric element of which the length varies with the variation in voltage.

3. An active vibration isolator as claimed in claim 2, wherein the solid element is formed of a magneto-striction element of which the length varies with a variation in magnetic field.

4. An active vibration isolator as claimed in claim 3, wherein each of the first and second sensors is an acceleration sensor or a velocity sensor.

5. An active vibration isolator as claimed in claim 2, wherein each of the first and second sensors is an acceleration sensor or a velocity sensor.

6. An active vibration isolator as claimed in claim 2, wherein each of the first and second sensors is an acceleration sensor or a velocity sensor.

7. An active vibration isolator as claimed in claim 1, wherein the solid element is formed of a magneto-striction element of which the length varies with the variation in magnetic field.

8. An active vibration isolator as claimed in claim 7, wherein each of the first and second sensors is an acceleration sensor or a velocity sensor.

9. An active vibration isolator as claimed in claim 1, wherein each of the first and second sensors is an acceleration sensor or a velocity sensor.

10. An active vibration isolator as claimed in claim 1, the controller including a main feedback system by which a signal from the first sensor is fed back to the power input portion through a first controlled element and a second controlled element, and a local feedback system by which a signal from the second sensor is fed back to the power input portion through the second controlled element, and wherein the local feedback system causes the solid element to generate an operating force which cancels out the vibrations of the intermediate mass element and the main feedback system causes the solid element to generate an operating force which causes the intermediate mass element to vibrate so as to cancel out the vibrations of the object in the acting direction.

11. An active vibration isolator comprising:

an intermediate mass element placed in a space between an object to be isolated from vibration and a supporting surface;

a first elastic member having one end fixed to the intermediate mass element and the other end fixed to the object and exerting spring action on the intermediate mass element and the object;

a linear motor placed between the intermediate mass element and the supporting surface and, with respect to an acting direction along the length thereof that varies with a variation in magnetic field, having one end fixed to the supporting surface and the other end fixed to the intermediate mass element, and having spring action;

a power input portion connected to, for causing the variation in magnetic field in, the linear motor;

a first sensor, fixed relative to the supporting surface, for detecting a vibratory state of the object with respect to the acting direction;

a second sensor, fixed relative to the supporting surface, for detecting a vibratory state of the intermediate mass element with respect to the acting direction; and a controller connected to, for receiving signal input from, the first sensor and the second sensor, and for outputting to the power input portion a signal which causes the variation in magnetic field such that the intermediate mass element vibrates to cancel out the vibrations of the object in the acting direction.

12. An active vibration isolator as claimed in claim 11, wherein each of the first and second sensors is an acceleration sensor or a velocity sensor.

13. An active vibration isolator as claimed in claim 2, the controller including a main feedback system by which a signal from the first sensor is fed back to the power input portion through a first controlled element and a second controlled element, and a local feedback system by which a signal from the second sensor is fed back to the power input portion though the second controlled element, and wherein the local feedback system causes the linear motor to generate an operating force which cancels out the vibrations of the intermediate mass element and the main feedback system causes the linear motor to generate an operating force which causes the intermediate mass element to vibrate so as to cancel out the vibrations of the object in the acting direction.

14. An active vibration isolator comprising:

an intermediate mass element placed in a space between an object to be isolated from vibration and a supporting surface;

a first elastic member having one end fixed to the intermediate mass element and the other end fixed to the object and exerting spring action on the intermediate mass element and the object;

a pneumatic actuator placed between the intermediate mass element and the supporting surface and, with respect to an acting direction along the length thereof that varies with a variation in air pressure generated inside thereof, having one end fixed to the supporting surface and the other end fixed to the intermediate mass element, and having spring action;

a power input portion connected to, for causing the variation in air pressure in, the pneumatic actuator;

a first sensor, fixed relative to the supporting surface, for detecting a vibratory state of the object with respect to the acting direction;

a second sensor, fixed relative to the supporting surface, for detecting a vibratory state of the intermediate mass element with respect to the acting direction; and a controller connected to, for receiving signal input from, the first sensor and the second sensor, and for outputting to the power input portion a signal which causes the variation in air pressure such that the intermediate mass element vibrates to cancel out the vibrations of the object in the acting direction.

15. An active vibration isolator as claimed in claim 14, wherein each of the first and second sensors is an acceleration sensor or a velocity sensor.

16. An active vibration isolator as claimed in claim 14, wherein the controller includes a main feedback system by which a signal from the first sensor is fed back to the power input portion through a first controlled element and a second controlled element, and a local feedback system by which a signal from the second sensor is fed back to the power input portion through the second controlled element, and wherein the local feedback system causes the pneumatic actuator to generate an operating force which cancels out the vibrations of the intermediate mass element and the main feedback system causes the pneumatic actuator to generate an operating force which causes the intermediate mass element to vibrate so as to cancel out the vibrations of the object in the acting direction.

17. An active vibration isolator as claimed in claim 16, wherein each of the first and second sensors is an acceleration sensor or a velocity sensor.

* * * * *